United States Patent
Bannert et al.

(10) Patent No.: US 6,250,579 B1
(45) Date of Patent: *Jun. 26, 2001

(54) BELT WINDER

(75) Inventors: Georg Bannert, Ummendorf; Christian Husung, Boebingen; Martin Wifling; Robert Fleischmann, both of Neu Ulm; Hermann Hasse, Lonsee; Andreas Wengert, Mutlangen; Leonhard Mayer, Sontheim/Brz.; Oswald Lustig, Herrlingen/Blaustein; Robert Kopetzky, Lonsee; Roland Schnabl, Ulm; Richard Frank, Elchingen; Thomas Kempfle, Bibertal, all of (DE)

(73) Assignee: Takata (Europe) Vehicle Safety Technology GmbH, Ulm (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,174

(22) Filed: Oct. 27, 1998

(30) Foreign Application Priority Data

Oct. 27, 1997 (DE) .............................. 197 47 461

(51) Int. Cl.$^7$ .................................................. B60R 22/28
(52) U.S. Cl. ........................................ 242/379.1; 280/806
(58) Field of Search ...................... 242/379.1; 280/805, 280/806; 297/470, 471, 472

(56) References Cited

U.S. PATENT DOCUMENTS

| 5,443,222 | * | 8/1995 | Modinger et al. ................ 242/379.1 |
| 5,558,295 | * | 9/1996 | Bauer ............................... 242/379.1 |
| 5,611,498 | * | 3/1997 | Miller et al. ..................... 242/379.1 |
| 5,618,006 | * | 4/1997 | Sayles ............................. 242/379.1 |
| 5,788,177 | * | 8/1998 | Keller et al. .................... 242/379.1 |
| 5,799,893 | * | 9/1998 | Miller et al. ..................... 242/379.1 |
| 5,961,060 | * | 10/1999 | Brambilla et al. .............. 242/379.1 |

FOREIGN PATENT DOCUMENTS

| 43 31 057 | 3/1995 | (DE) . |
| 195 17 440 | 11/1995 | (DE) . |
| 296 22 181 U | 4/1997 | (DE) . |
| 195 44 783 | 6/1997 | (DE) . |
| 196 53 510 | 6/1997 | (DE) . |
| 97 06994 | 2/1997 | (WO) . |

OTHER PUBLICATIONS

Patent Abstracts of Japan, vol. 097, No. 010, Oct. 31, 1997 & JP 09 164911 A (Nippon Seiko KK), Jun. 24, 1997.

* cited by examiner

Primary Examiner—John M. Jillions
(74) Attorney, Agent, or Firm—Foley & Lardner

(57) ABSTRACT

A belt winder for safety belts has a spindle (14) for the winding up of the safety belt (18) and a rotatable latching flange (12) which can be latched with respect to a fixed base frame (10). A torsion bar (16) is rotationally fixedly connected at its one end to the spindle (14) and is rotationally fixedly connected at its other end to the latching flange (12). A further torsion bar (26) is provided, which can be selectively switched in.

15 Claims, 3 Drawing Sheets

BELT WINDER

Figure 1:
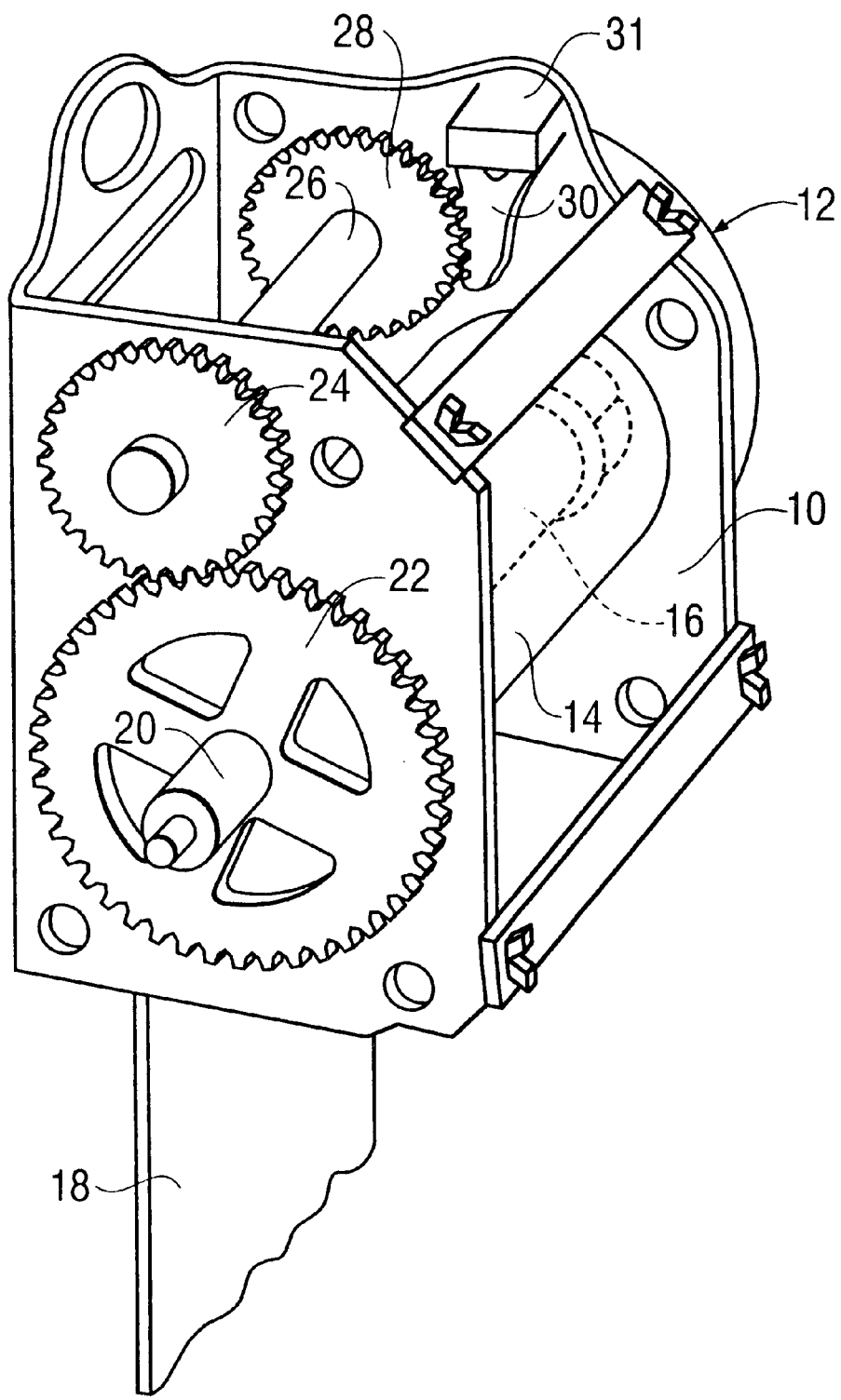

The present invention relates to a belt winder for safety belts comprising a spindle for the winding up of the safety belt which can be latched with respect to a fixed base frame and comprising a force limiting element which can be latched with respect to the fixed base frame.

Belt winders of this kind are known in principle and enable a belt force limiting for the vehicle passenger in the event of an accident. In an accident the spindle latches with respect to the fixed base frame so that a further drawing out of the safety belt or a further rotation of the spindle respectively is not possible. When a force is further exerted on the belt band however the force limiting element is activated (a torsion bar is rotated) which is latched between the spindle and the base frame, through which energy is converted into mechanical deformation and heat.

The problem (object) lying at the basis of the invention is to further develop a belt winder of the initially named kind to such an extent that an individually controllable belt force limitation is possible.

This object is satisfied in particular in that at least one further force limiting element is provided which is in engagement with or can be brought into engagement with the spindle and which can be latched or is latched with respect to the fixed base frame.

Thus in accordance with the invention an additional force limiting element is additionally employed which can be coupled to the already present force limiting element or decoupled from the latter. In the case of heavy passengers the additional force limiting element can be additionally coupled on in the event of an accident, whereas a decoupling of the two elements is possible for a light passenger or in a less severe accident respectively. Thus in the framework of an "intelligent" energy management system in a belt winder the belt force acting on the passenger can be set individually in dependence on the size and weight of the passenger and the severity of the accident. For this, the size and/or the weight of the passenger can be detected (under certain circumstances already prior to the accident), whereupon the two elements can be coupled or decoupled after the occurrence of the accident in order to control the desired force behavior of the belt band.

Advantageous embodiments of the invention are described in the description, in the drawings and in the subordinate claims.

In accordance with a first advantageous embodiment a pyrotechnic device can be provided for the bringing into engagement or for the latching of the further force limiting element. With a pyrotechnic ignition charge the additional force limiting element (preferably a torsion bar) can be coupled to the belt winder or decoupled from the latter in a simple manner, with very short reaction times being possible. For the latching of the further force limiting element a stop or locking pawl can be provided which is preferably also pyrotechnically releasable. Through this the pawl is moved in a release of the pyrotechnic ignition charge so that the former enters into engagement with the further force limiting element and blocks the latter.

In accordance with a further embodiment the further force limiting element is provided at its one end with a gear which engages with a gear which is fastened to a spindle. In this embodiment the further force limiting element moves with the spindle in the normal case since a continuous coupling is provided. Alternatively, it is possible to couple the further force limiting element to the spindle only when this is required. In this case the other end of the element can be continuously latched with respect to the base frame.

A constructionally particularly favourable solution results when the further force limiting element is arranged outside the spindle, since in this case the space which is usually still available is used favourably.

It is particularly advantageous when a plurality of further force limiting elements is provided which can selectively be brought into engagement with the spindle. In this embodiment an individual adaptation to the greatest variety of passengers and accident situations is possible so that the belt force acting on the passenger can be adapted to the respective situation in the best possible manner.

Preferably a transmission which can be shifted is provided between the spindle and the further force limiting element. In this case a differing behavior of the belt winder can be set through shifting of the transmission. For this the transmission can have a two-armed lever, at the ends of which a gear is in each case arranged. Through pivoting of the lever in the one or in the other direction in each case a gear can thereby be coupled to the spindle with a different transmission ratio so that through this as well an adaptation to the actual circumstances is possible.

Torsion bars can preferably be used as force limiting elements.

Figure 2:
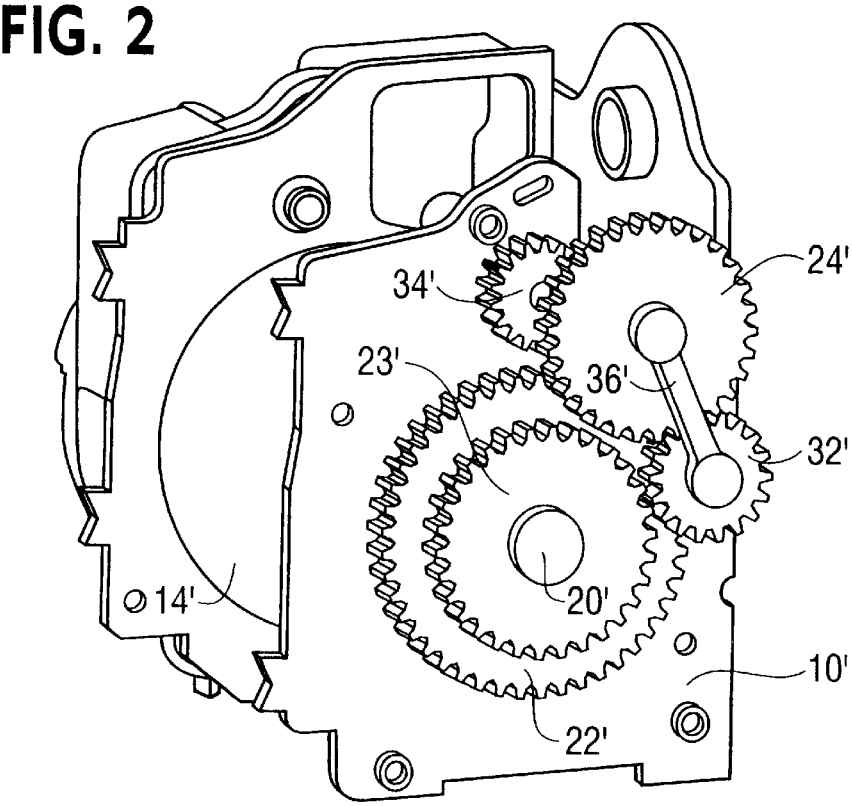
Figure 3:
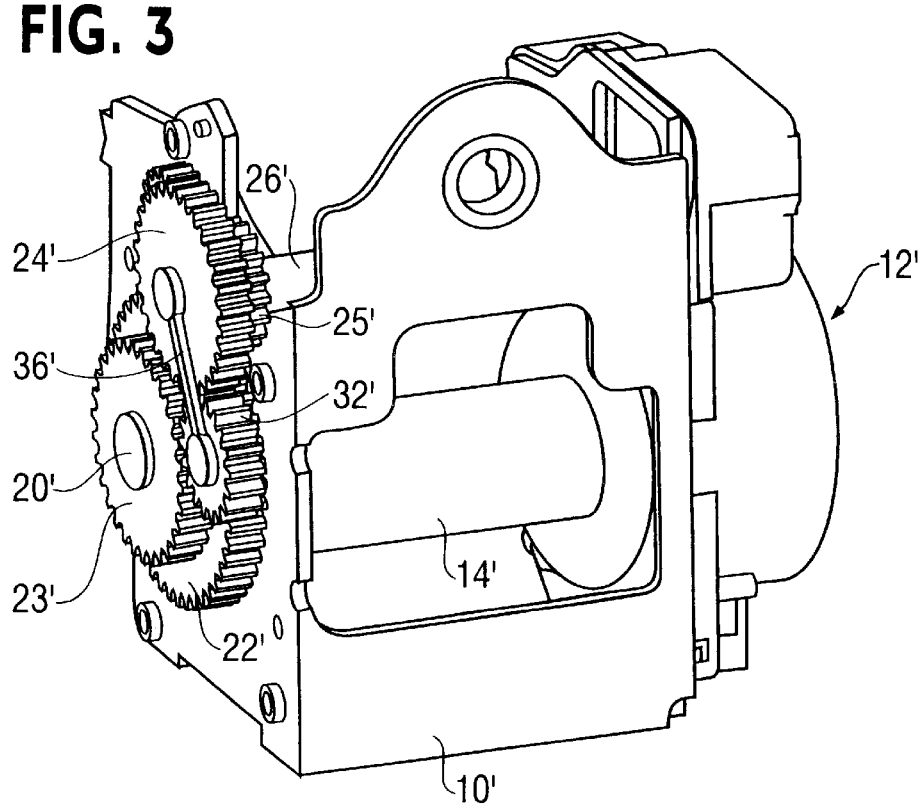

The following invention will be explained in the following in a purely exemplary manner with reference to advantageous embodiments and with reference to the accompanying drawings. Shown are:

FIG. 1 a perspective view of a first embodiment of a belt winder;

FIG. 2 a perspective side view of a second embodiment of a belt winder;

FIG. 3 a perspective rear view of the belt winder of FIG. 2; and

Figure 4:
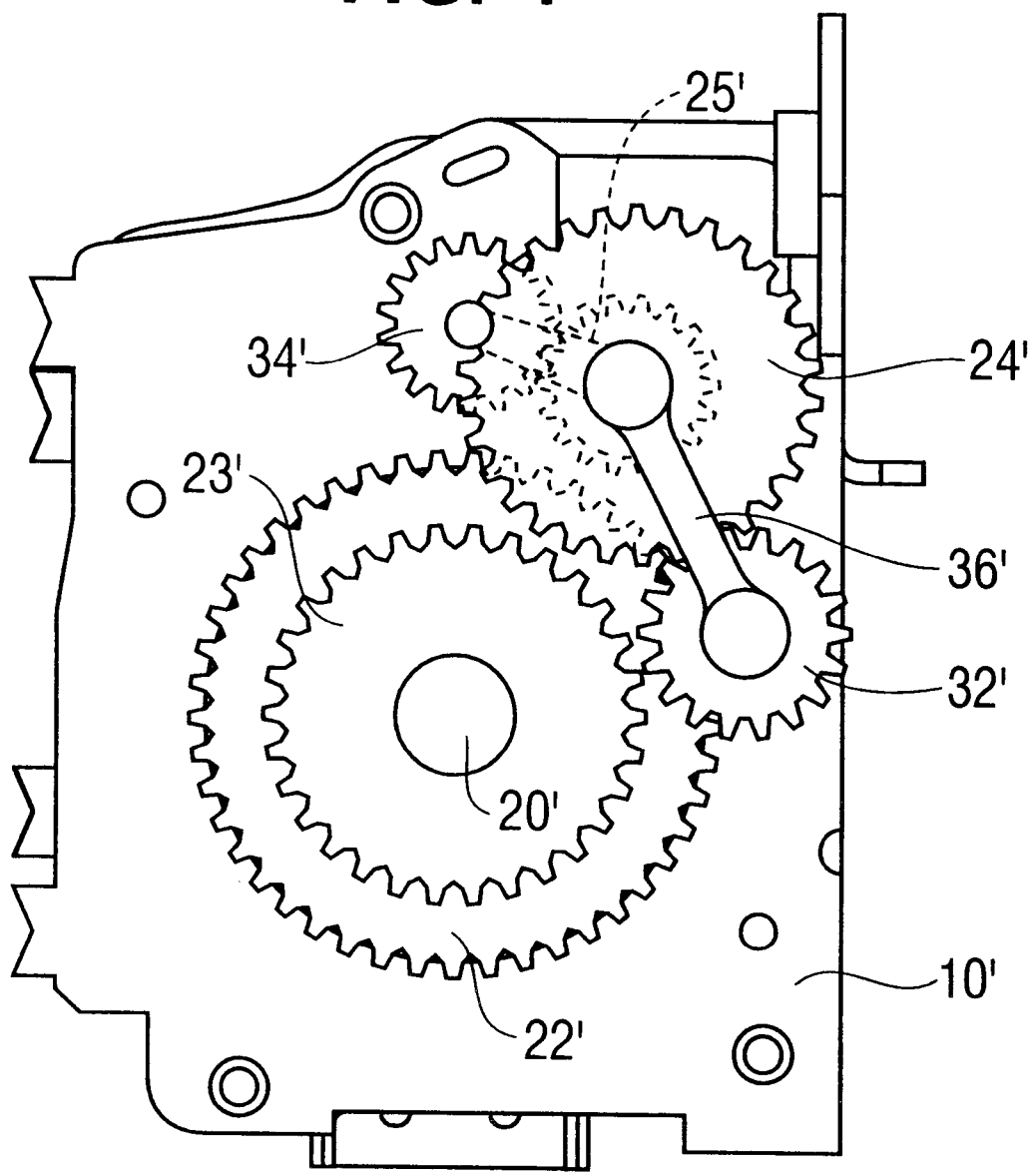

FIG. 4 a side view of the belt winder of FIG. 2 and FIG. 3.

FIG. 1 shows a first embodiment of a belt winder for a safety belt, which has a fixed base frame 10 on which a spindle 14 is rotatably mounted. The spindle 14 serves for the winding up of the safety belt 18 and is provided with a bias tension by a spring for this purpose in such a manner that the safety belt winds up automatically.

The spindle 14 is connected at its (in FIG. 1 right) end to a latching flange 12 (which is not shown in detail) which normally rotates together with the spindle 14. In the event of an accident, or in braking or in a travelling of the vehicle around a curve respectively, the latching flange 12 is latched with respect to the fixed base frame 10 so that the spindle 14 no longer rotates and the safety belt 18 is blocked.

A force limiting element in the form of a torsion bar 16 is rotationally fixedly connected to the spindle 14 at its one (in FIG. 1 left) end and to the latching flange 12 at its other (in FIG. 1 right) end. Thus in the event of a latching of the latching flange 12 with respect to the fixed base frame 10 the force transmission takes place from the safety belt 18 via the spindle 14, from there via the torsion bar 16 to the latching flange 12 and from there to the fixed base frame 10.

As can furthermore be easily recognised in FIG. 1 a gear 22 is rotationally fixedly located outside at the shaft 20 of the spindle 14 and engages with a further gear 24 of smaller diameter, which in turn is rotationally fixedly connected to a further force limiting element in the form of a torsion bar 26, which extends parallel to the first torsion bar 16 but outside the spindle. At its end lying opposite to the gear 24 the further torsion bar 26 is rotationally fixedly connected to a further gear 28 which can be latched via a pawl 30 to the fixed base frame 10. The pawl 30 can be driven in and/or driven out via a (non-illustrated) pyrotechnic device.

The operating method of the belt winder illustrated in FIG. 1 is as follows. In normal operation, i.e. at standstill or normal travel of the vehicle, the safety belt 18 can be freely rolled onto and off the spindle 14, with the spindle 14 rotating about the shaft 20 together with the thereto connected gear 22. Together with this rotation there also occur a rotation of the latching flange 12 and a rotation of the further torsion bar 26, which is coupled via the gear 24 and the gear 22 to the spindle 14.

In the event of an accident the latching flange 12 is latched with respect to the fixed base frame 10 so that the spindle 14 can no longer rotate any further. As the force in the safety belt 18 increases however a rotation of the torsion bar 16, which is rotationally fixedly arranged between the base frame 10 and the spindle 14, takes place so that the spindle rotates further after a torsion of the torsion bar 16. In so far as, for example, a particularly heavy passenger is present on the vehicle seat which is provided with the belt winder, the pyrotechnic device can be ignited at a definite time point in order to drive in the pawl 30 and to block the gear 28. Now the further torsion bar 26 is also activated, which is likewise twisted when a draw force is applied to the safety belt 18.

The energy management system which is provided in the vehicle can, depending on the total deflection of the safety belt 18 and depending on other parameters, also drive out the pawl 30 of the further torsion bar 26 again where appropriate in order to effect a desired force behavior.

FIGS. 2 to 4 show a second embodiment of a belt winder, with the same reference symbols, however with primes being used for similar constructional parts.

The belt winder illustrated in FIGS. 2 to 4 is similar in its basic construction to the embodiment illustrated in FIG. 1, i.e. this belt winder also has a fixed base frame 10' which journals a spindle 14' for the winding up of a (non-illustrated) safety belt, with a rotatable latching flange 12' rotating together with the spindle 14' and being latchable with respect to the fixed base frame 10'. A (non-illustrated) torsion bar is rotationally fixedly connected at its end to the spindle 14' and is rotationally fixedly connected at its other end to the latching flange 12'.

In this embodiment a further torsion bar 26' (FIG. 3) is also provided outside the spindle 14' which can be switched in when required in addition to the first torsion bar inside the spindle.

The further torsion bar 26' is rotationally fixedly connected at its one (in FIG. 3 right) end to the base frame 10'. The other (in FIG. 3 left) end of the torsion bar 26' is connected to the spindle 14' via a transmission which can be shifted. As can best be seen in FIG. 4, further torsion bar 26' is rotationally fixedly connected to a gear 25' of smaller diameter and to a gear 24' of larger diameter which is arranged above the gear 25'. On the shaft 20' of the spindle 14' a gear 22' of larger diameter and a gear 23' of smaller diameter lying above it are rotationally fixedly mounted, with the gears 22' and 23' not meshing with the gears 24' and 25'. For the coupling of the further torsion bar 26' to the spindle 14' a two-armed lever 36' is provided which is pivotal about an axis which extends through the further torsion bar 26'. At one end of the lever 36', which is designed in a bent manner, a gear 32' is provided which meshes with the upwardly disposed gear 24' of the further torsion bar. At the other end of the lever 36' a gear 34' is provided which meshes with the gear 25', which is rotationally fixedly connected to the further torsion bar.

In order to be able to couple the further torsion bar 26' to the spindle 24', the lever 36' is deflected by a (non-illustrated) pyrotechnic device in such a manner that it rotates either clockwise or counter-clockwise. In a clockwise rotation (FIG. 4) the gear 32', which is arranged at the end of the lever 36', couples into the gear 23' of the spindle shaft 20' so that the spindle shaft 20' is coupled via the gear 23', the gear 32' and the gear 24' to the further torsion bar 26'. In a counter-clockwise rotation the lever 36' is pivoted in such a manner that the gear 34' which is mounted at the other end engages into the gear 22' of the spindle shaft 20'. In this a rotational coupling of the spindle 14' takes place via the spindle shaft 20', from there via the gear 22', the gear 34' and the gear 25' to the further torsion bar 26'. As can well be recognised, through the clockwise or counter-clockwise pivoting of the lever 36', in each case a different transmission ratio between the spindle 14' and the further torsion bar 26' is achieved.

It is pointed out that in addition to the illustrated embodiments a plurality of couplings or transmissions is possible in order to couple the further torsion bar to the first torsion bar or to the spindle respectively. A plurality of torsion bars or torsion elements which can be selectively coupled in and out can also be used.

Priority application, German 19747461.6, filed Oct. 27, 1997, is hereby incorporated by reference.

LIST OF REFERENCE NUMERALS 10, 10' base frame
12, 12' latching flange
14, 14' spindle
16 torsion bar
18 safety belt
20, 20' shaft
22, 22' gear
23, 23' gear
24, 24' gear
25 gear
26, 26' further torsion bar
28 gear
30 stop pawl
32' gear
34' gear
36' lever

What is claimed is:

1. Belt winder for safety belts, comprising:
    a spindle for the winding up of the safety belt adapted to be latched with respect to a fixed base frame, and
    a force limiting element adapted to be latched between the spindle and the base frame,
    wherein at least one further force limiting element is provided which is adapted to be engaged with the spindle and which is adapted to be latched with respect to the fixed base frame, and
    wherein a shiftable transmission is provided between the spindle and the further force limiting element.

2. Belt winder in accordance with claim 1, characterised in that
    a pyrotechnic device is provided for the bringing into engagement or for the latching of the further force limiting element.

3. Belt winder in accordance with claim 1, characterised in that
    a engageable pawl is provided for the latching of the further force limiting element.

4. Belt winder in accordance with claim 1, characterised in that
    the further force limiting element is provided at its one end with a gear which engages with a gear which is provided on the spindle.

5. Belt winder in accordance with claim 1, characterised in that
the further force limiting element is arranged outside the spindle.

6. Belt winder in accordance with claim 1, characterised in that
the transmission has a two-armed lever, at the ends of which a gear is in each case arranged.

7. Belt winder in accordance with claim 1, characterised in that
the further force limiting element is permanently in engagement with the spindle.

8. Belt winder in accordance with claim 1, characterised in that
the first and/or the further force limiting element is a torsion bar.

9. Belt winder for safety belts, comprising:
a spindle for winding up the safety belt;
a force limiting element adapted to be latched between the spindle and a fixed base frame; and
at least one further force limiting element adapted to be engaged with the spindle and adapted to be disengaged from the spindle after being engaged.

10. The belt winder according to claim 9, wherein the further force limiting element is not engaged with the spindle during normal operation, but becomes engaged when the force limiting element is latched, and wherein a portion of the further force limiting element is continuously latched to the base frame.

11. Belt winder for safety belts, comprising:
a spindle for winding up the safety belt;
a fixed base frame;
a force limiting element adapted to be latched between the spindle and the fixed base frame by a first latching device; and
a further force limiting element adapted to be engaged with the spindle and adapted to be disengaged from the spindle after being engaged; and
a second latching device adapted to latch the spindle to the base frame through the further force limiting element and further adapted to thereafter unlatch the latching of the spindle to the base frame through the further force limiting element.

12. Belt winder for safety belts, comprising:
a base frame;
a spindle for winding up the safety belt;
a force limiting element adapted to be latched between the spindle and the base frame;
a first latching device having two states, a first state being a disengaged state wherein the spindle is not latched to the base frame through the force limiting element, and a second state being an engaged state wherein the spindle is latched to the base frame through the force limiting element;
a further force limiting element adapted to be engaged with the spindle and adapted to be disengaged with the spindle after being engaged; and
an additional latching device having three states, a first state being a disengaged state wherein the spindle is not latched to the base frame through the further force limiting element, a second state being an engaged state wherein the spindle is latched to the base frame through the further force limiting element, and a third state being the disengaged state after a time when the additional latching device has been in the second state.

13. The belt winder according to claim 12, wherein the additional latching device enters its second state when the first latching device is in its second state.

14. Method for a controlled limiting of a belt force of a belt winder for safety belts, comprising the steps of:
a) latching a spindle of the belt winder to a base frame of the belt winder through a force limiting element;
b) coupling the force limiting element to a further force limiting element; and
c) uncoupling the force limiting element from the further force limiting element after step b while maintaining the spindle latched to the base frame through the force limiting element.

15. The method of claim 14, wherein step c is accomplished while a draw force is applied to the safety belt.

* * * * *